United States Patent [19]

Tury

[11] Patent Number: 4,922,769

[45] Date of Patent: May 8, 1990

[54] ELECTRICAL CONTROL SYSTEM FOR CONTROL OF AN AUTOMATIC TRANSMISSION APPARATUS

[75] Inventor: Edward L. Tury, Brighton, Mich.

[73] Assignee: Automotive Products (U.S.A.) Inc., Sterling Heights, Mich.

[21] Appl. No.: 311,982

[22] Filed: Feb. 16, 1989

Related U.S. Application Data

[63] Continuation-in-part of Ser. No. 108,812, Oct. 15, 1987, Pat. No. 4,817,471, which is a continuation-in-part of Ser. No. 62,775, Jun. 16, 1987, Pat. No. 4,790,204.

[51] Int. Cl.⁵ ............................................. B60K 41/18
[52] U.S. Cl. ........................................ 74/866; 74/335
[58] Field of Search ................................. 74/335, 866

[56] References Cited

U.S. PATENT DOCUMENTS

| | | | |
|---|---|---|---|
| 4,495,457 | 1/1985 | Stahl | 74/866 X |
| 4,499,542 | 2/1985 | Hamajima et al. | 74/866 X |
| 4,635,508 | 1/1987 | Tatsumi | 74/866 |
| 4,702,127 | 10/1987 | Cote | 74/866 |
| 4,779,490 | 10/1988 | Milunas et al. | 74/866 X |
| 4,817,471 | 4/1989 | Tury | 74/866 |
| 4,843,901 | 7/1989 | Peterson et al. | 74/335 |
| 4,846,021 | 7/1989 | Hamano et al. | 74/866 |
| 4,848,529 | 7/1989 | Kurihara et al. | 74/866 X |
| 4,849,899 | 1/1989 | Cote et al. | 74/866 X |

Primary Examiner—Dirk Wright
Attorney, Agent, or Firm—Krass & Young

[57] ABSTRACT

This invention is an electrical control apparatus for control of a transmission apparatus in a motor vehicle which provides safety features and improper operation indications. The transmission apparatus has a plurality of transmission states and at least one motor adapted for shifting between transmission states. According to a first aspect of the invention the input device is a plurality of momentary contact push buttons, and the logic control unit provides a priority of transmission state selection in accordance to a predetermined hierarchy of priority if more than one push button is depressed. In accordance with a second aspect of the invention, the electrical control apparatus provides a fault indication, such as via a lamp, if said desired transmission state differs from said present transmission state for longer than a predetermined period of time. In accordance with a third aspect of the present invention, the electronic control apparatus includes a vehicle speed sensor, and the logic control unit inhibits shifting the transmission and provides an error indication, such as by a lamp, if the speed of the vehicle is too fast for the desired gear.

10 Claims, 10 Drawing Sheets

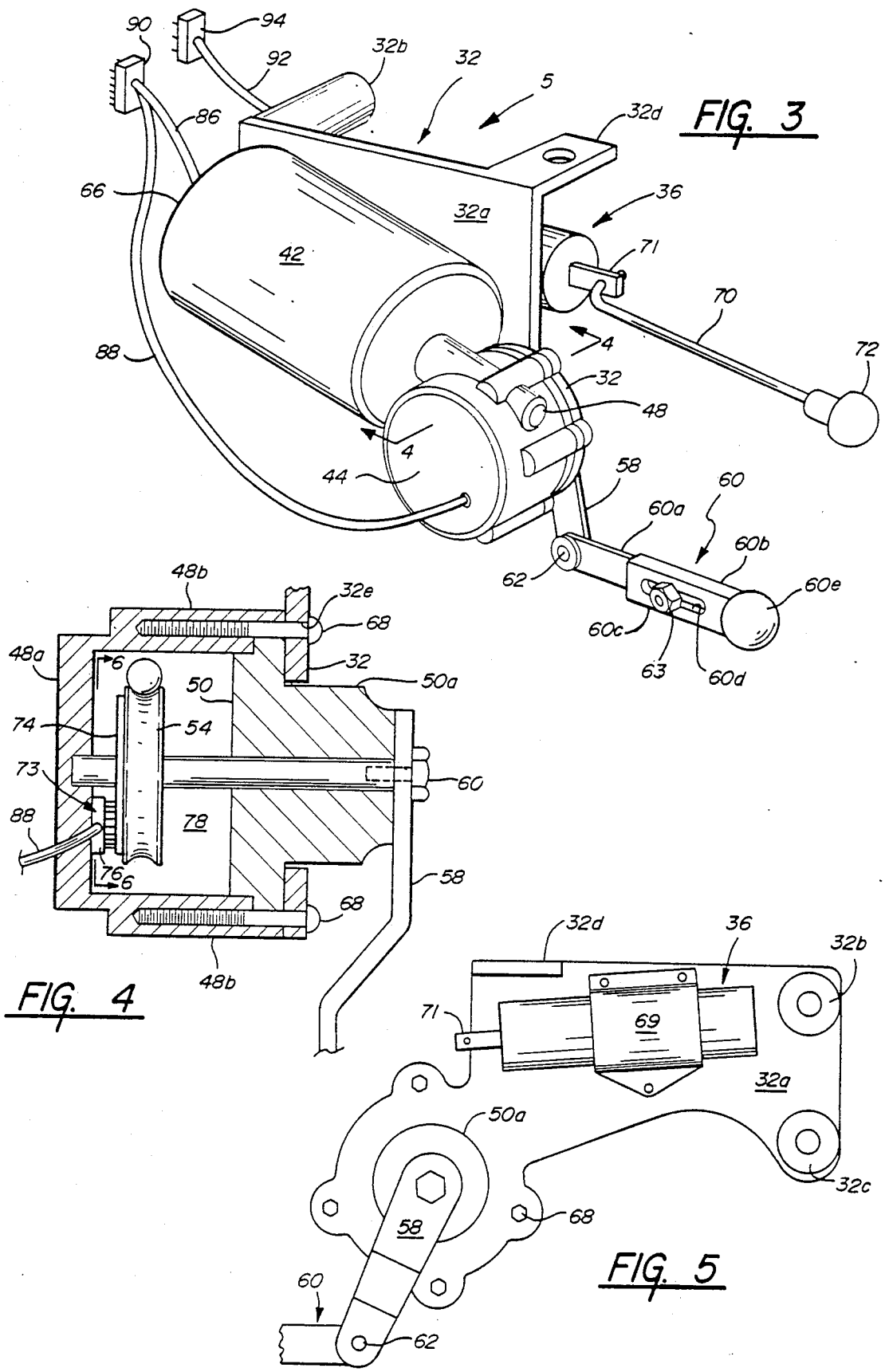

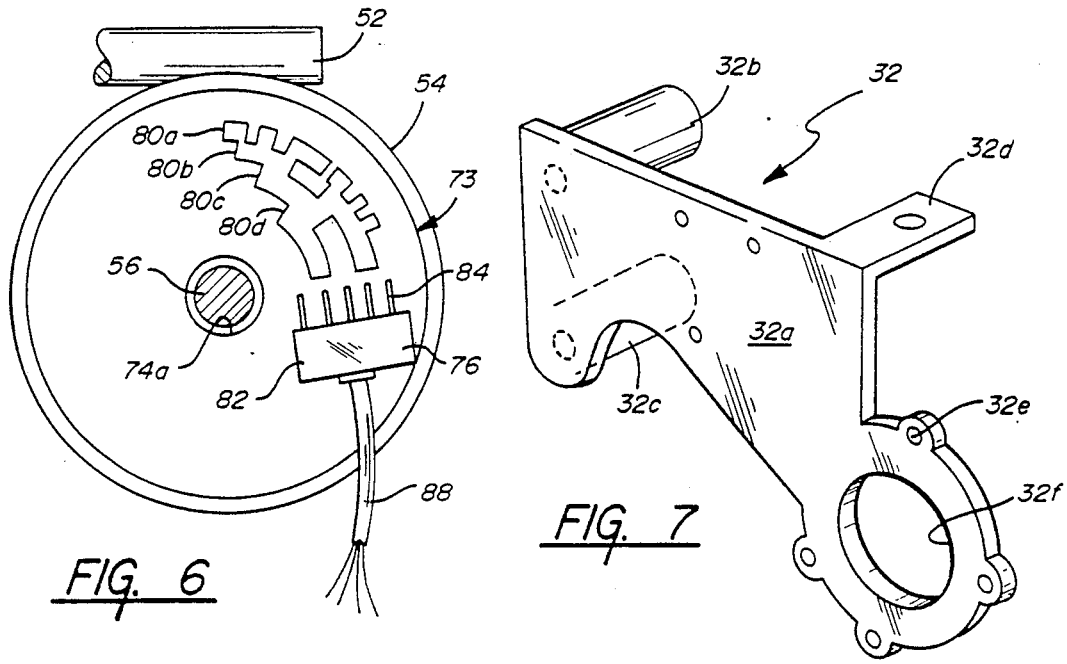
FIG. 6
FIG. 7
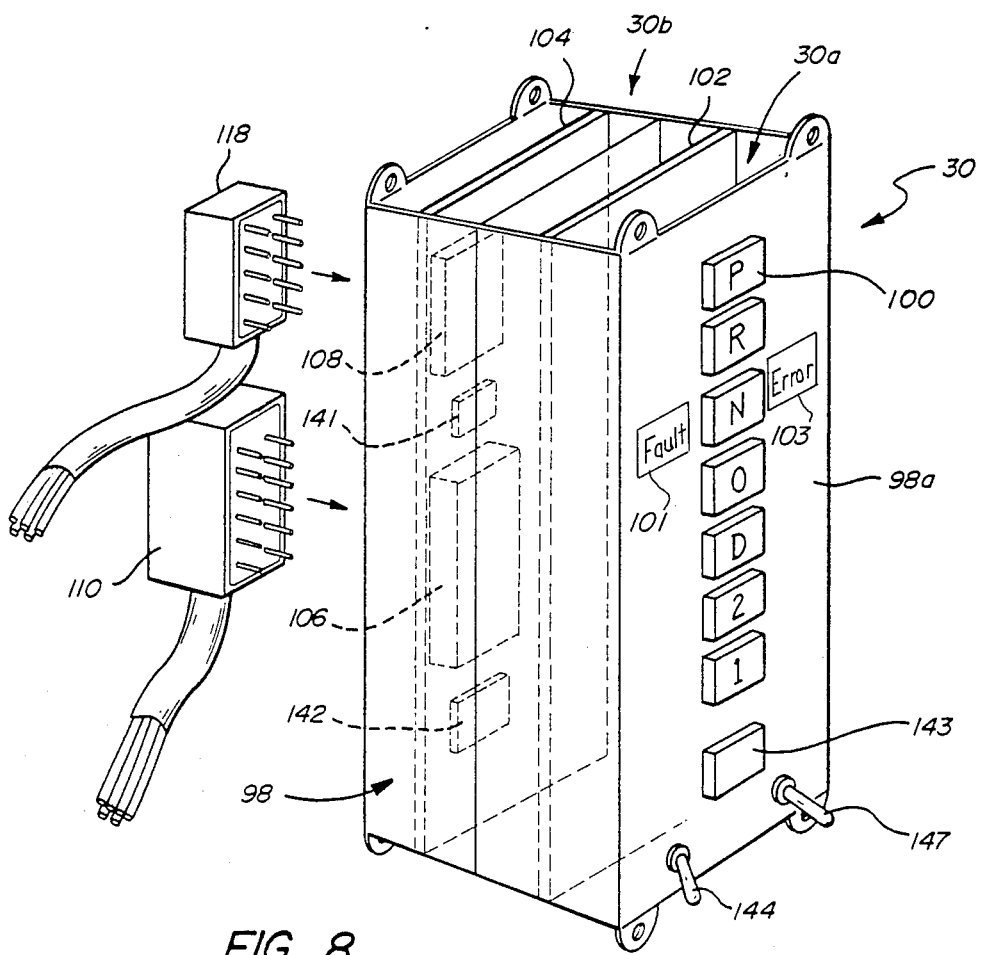
FIG. 8

ELECTRICAL CONTROL SYSTEM FOR CONTROL OF AN AUTOMATIC TRANSMISSION APPARATUS

CROSS-REFERENCE TO RELATED APPLICATION

The present application is a continuation-in-part of U.S. patent application Ser. No. 108,812 filed Oct. 15, 1987, now U.S. Pat. No. 4,817,471 which is a continuation-in-part of U.S. patent application Ser. No. 62,775 filed June 16, 1987 now U.S. Pat. No. 4,790,204.

BACKGROUND OF THE INVENTION

This invention relates to an electric shift apparatus especially suited for use with a motor vehicle having an automatic transmission.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called automatic transmissions have become popular in which much of the shifting is done without operator input in response to sensed speed and throttle opening parameters. These automatic transmissions typically include a mode select lever positioned on the transmission housing and movable between a plurality of selectively pivoted positions corresponding to a respective plurality of shift modes within the transmission. The mode select lever is pivotally moved between its several shift positions by a cable or linkage mechanism extending from the mode select lever to a suitable gear selector lever located in the passenger compartment of the vehicle. Various proposals have been made in the past to eliminate the mechanical interconnection between the driver operated lever and the mode select lever and provide instead an electrical signal generated by a suitable action on the part of the driver and transmitted electrically to some manner of power means arranged to move the mode select lever. None of these attempts to provide an electric shift mechanism for an automatic transmission of a motor vehicle have met with any degree of commercial success since they provided a slow or imprecise shifting action and/or have generated excessive warranty and maintenance costs.

SUMMARY OF THE INVENTION

This invention is an electrical control apparatus for control of a transmission apparatus in a motor vehicle which provides safety features and improper operation indications. The transmission apparatus has a plurality of transmission states and at least one motor adapted for shifting between transmission states. The electrical control apparatus includes generally an input device employed by the operator to select the desired transmission state, a transmission state sensing device for sensing the current state of the transmission, and a logic circuit for control of the at least one motor for shifting the transmission into the desired transmission state.

According to a first aspect of the invention the input device is a plurality of momentary contact push buttons, each corresponding to a predetermined transmission state. In this first aspect of the invention, the logic control unit provides a priority of transmission state selection. In the simplest case in which only a single momentary contact push button switch is depressed the desired transmission state corresponds to the single momentary contact push button depressed. In the case in which more that one of the momentary contact push buttons is depressed, then the desired transmission state corresponds to one of this plurality of momentary contact push buttons switches depressed in accordance to a predetermined hierarchy of priority from among the momentary contact push buttons switches depressed. In the preferred embodiment the hierarchy of priority in rank order from the highest priority to the lowest priority is the following: park, reverse, neutral, and the forward transmission states in order from highest final gear ratio to lowest final gear ratio.

In accordance with a second aspect of the invention, the electrical control apparatus provides a fault indication if said desired transmission state differs from said present transmission state for longer than a predetermined period of time. The logic control unit provides this indication to a fault indicator, such as a fault lamp which is illuminated upon generation of this fault signal. This provides an indication to the operator of a fault in the transmission apparatus. In addition, the logic control unit inhibits control of the at least one motor upon generation of said fault signal, thereby preventing futile attempts at shifting the transmission in the presence of a fault.

In accordance with a third aspect of the present invention, the electronic control apparatus includes a vehicle speed sensor for sensing the vehicle speed. The logic control unit compares the vehicle speed with a predetermined speed for the desired transmission state. If the vehicle speed is greater than a predetermined vehicle speed corresponding to the desired transmission state, the logic control unit inhibits control of the at least one motor, preventing shifting the transmission into that desired transmission state. This is a safety feature which prevents the over speeding of the engine. The logic control unit generates an error signal in such a case. The electronic control apparatus further provides an indication of such an error state, such as by illuminating an error lamp upon generation of this error signal.

BRIEF DESCRIPTION OF THE DRAWINGS

FIG. 3 is a perspective view of a power module employed in the invention electric shift apparatus;

FIG. 4 is a fragmentary cross-sectional view taken on line 4—4 of FIG. 3;

FIG. 5 is a fragmentary view taken in the direction of the arrow 5 in FIG. 3;

FIG. 6 is a cross-sectional view taken on line 6—6 of FIG. 4;

FIG. 7 is a perspective view of a bracket employed in the power module of the invention;

FIG. 8 is a fragmentary perspective view of a control module employed in the electric shift apparatus of the invention;

DETAILED DESCRIPTION OF THE PREFERRED EMBODIMENT

Figure 1:
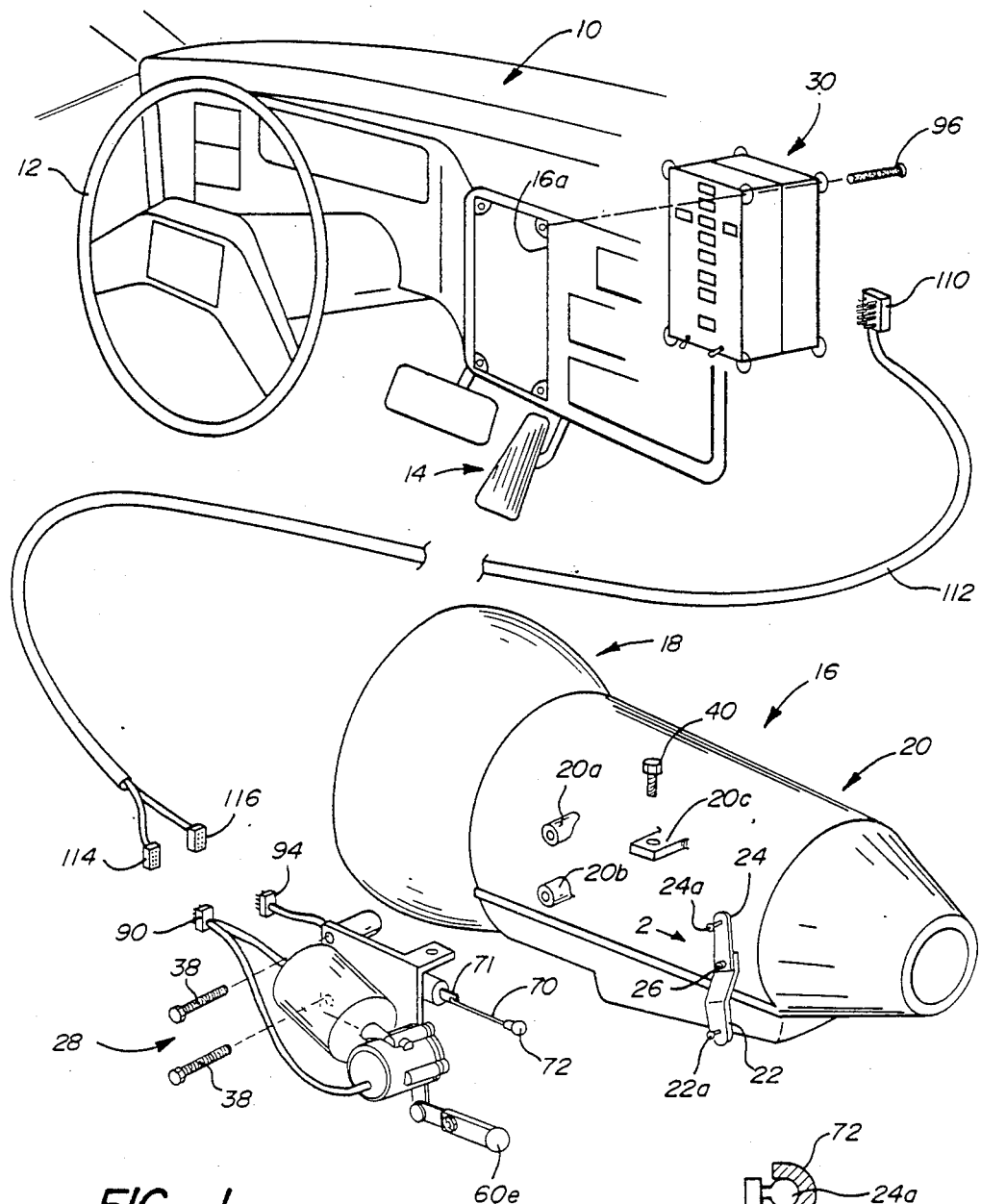
FIG. 1 is a fragmentary perspective view of a motor vehicle embodying the invention electric shift apparatus.
Figure 2:
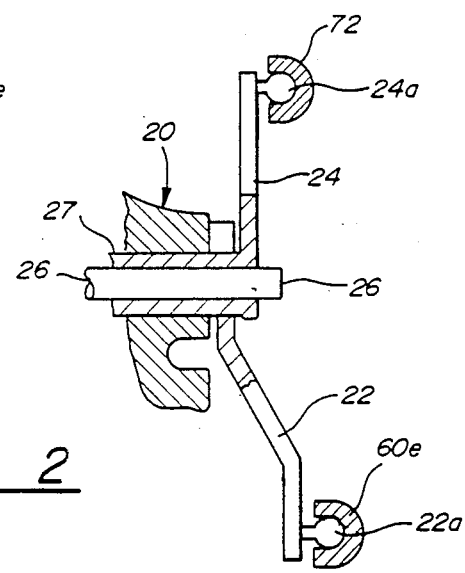
FIG. 2 is a fragmentary view looking in the direction of the arrow 2 in FIG. 1.

The electric shift apparatus including the electrical control system of the present invention is seen schematically in FIG. 1 in association with a motor vehicle of the type including an instrument panel assembly 10 positioned within the passenger compartment of the motor vehicle; a steering wheel 12 associated with the instrument panel; an accelerator pedal assembly 14; and an automatic transmission assembly 16 including a torque converter 18 and a transmission 20. Transmission 20 includes a mode select lever 22 and a kick-down lever 24 each mounted externally of the transmission housing for pivotal movement at one end thereof about a common axis. Specifically, kick-down lever 24 is fixedly mounted at its lower end on a shaft 26 and mode select lever 22 is fixedly mounted at its upper end on a tubular shaft 27 (see FIG. 2) mounted concentrically on shaft 26. It will be understood that selected pivotal movement of mode select lever 22 rotates tubular shaft 27 to operate internal devices within the transmission to position the transmission in a plurality of transmission modes such as park, neutral, drive, etc., and that pivotal movement of kick-down lever 24 rotates shaft 26 to operate internal devices within the transmission to the next lower gear for passing purposes or the like.

Power module 28 is adapted to be bolted to the transmission in proximity to levers 22 and 24 and includes a bracket 32, a motor assembly 34, and a solenoid 36.

Bracket 32 may be formed as a die casting and includes a planar main body portion 32a, lug portions 32b and 32c and a flange portion 32d. Bracket 32 is readily bolted to the housing of transmission 20 by bolts 38 passing through lugs 32b and 32c for threaded engagement with threaded bosses 20a and 20b on the transmission housing, and by a bolt 40 passing downwardly through an aperture in a flange 32 on the transmission housing for threaded engagement with a lug 20c on the transmission. Bosses 20a and 20b and lug 20c are already present on a typical automatic transmission housing and therefore need not be especially provided to carry out the invention.

Motor assembly 34 includes a DC electric motor 42, a speed reduction unit 44, and a lever assembly 46.

Motor 42 is direct current and may for example have an output torque rating of 200 inch pounds.

Speed reduction unit 44 is suitably secured to motor 42 and includes a housing 48, a cover plate 50 having a central hub member 50a, a worm gear 52 co-axial with the output drive of the motor 42, a worm wheel 54 driven by worm gear 52, and an output shaft 56 driven by worm wheel 54 and journalled in cover plate 50 and in an end wall 48a of housing 48.

Lever assembly 46 includes a first lever 58 secured by a nut 60 to the free end of speed reduction unit output shaft 56, and a second lever 60 secured by pivot means 62 to the free end of lever 58. Lever 60 is a compound member and includes sections 60a and 60b. Section 60b telescopically receives section 60a and with a pin 60c carried by section 60a guiding in a slot 60d in section 60b to allow the two sections to move axially relative to each other to vary the effective length of lever 60. The two sections may be locked in any selected position of adjustment by a nut 63 carried by pin 60c. The free end of lever 60 comprises a plastic snap fitting 60e for snapping engagement with a ball fitting 22a on the free end of mode select lever 22.

Figure 13:
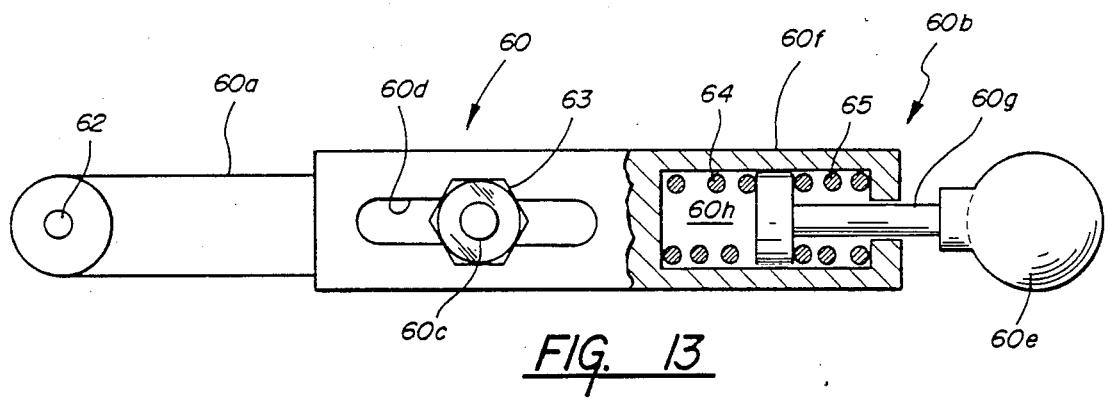
FIG. 13 is a view of a modified lever assembly for use in the invention electric shift apparatus.

A modified version of compound lever 60 is shown in FIG. 13. In the arrangement of FIG. 13, lever section 60b of compound lever 60 is itself a compound member including a first member of 60f and a second member 60g. Member 60f is connected by slot 60d and pin 60c to lever section 60a and defines a central cavity 60h. Member 60g carries snap fitting 60e at its free end and is slidably received at its other end in cavity 60h with a pair of matched coil springs 64,65 positioned in cavity 60h and engaging opposite sides of a piston member 60i mounted on member 60g in cavity 60h.

The motor assembly 34 is mounted on the outboard face of the planar main body portion 32a of bracket 32. Specifically, motor 42 is mounted to the outboard face of bracket portion 32a by a bracket 66 and speed reduction unit 44 is mounted to the outboard face of bracket portion 32a by a plurality of circumferentially spaced bolts 68 passing through apertures 32e in bracket 32 and through suitable apertures in speed reduction unit cover plate 50 for engagement with threaded bosses 48b spaced circumferentially about housing 48. In assembled relation, the hub portion 50a of cover plate 50 passes through aperture 32f in bracket 32 to position lever 58 on the inboard face of the bracket.

Solenoid 36 may comprise for example a pull type unit capable of generating three pounds of pull and having a stroke of between three-eighths and one-half inch. Solenoid 36 is secured to the inboard face of planar main body portion 32a of bracket 32 by a clamp 69. A cable 70 is secured to the plunger 71 of the solenoid and a plastic snap fitting 72 is secured to the free end of cable 70.

Power module 28 further includes an encoder assembly 73 operative to sense the shift position of the transmission and generate an encoded signal representative of the sensed shift position.

Encoder assembly 73 includes an encoder wheel 74 and a pick-up device 76. Encoder wheel 74 may be formed for example of a suitable plastic material with conductive coating and is positioned on a side face of worm wheel 54 within the closed and sealed interior chamber 78 defined by housing 48 and cover plate 50. Encoder wheel 74 includes a central aperture 74a passing speed reduction unit output shaft 56 and further includes code indicia 80 provided on the exposed outer face of the wheel and arranged along four arcuate tracks 80a, 80b, 80c and 80d centered on the center line of the encoder wheel.

Pick-up device 76 includes a body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pick-up device 76 are combined into a pin-type plug 90 and a lead 92 from solenoid 36 terminates in a pin-type plug 94.

Control module 30 is intended for ready installation in an opening 10a in instrument panel 10 or a center console disposed between the two front seats by insertion of the module from the rear of the housing and fastening of the module within opening 10a by the use of several fasteners such as seen at 96. Module 30 includes a housing structure 98 of general box-like configuration enclosing an operator access or push-button submodule 30a and a logic submodule 30b.

Push-button submodule 30a includes a plurality of push-buttons 100 positioned in vertically spaced relation in the front face 98a of the module housing and corresponding to the available transmission shift modes. Specifically, buttons 100 include buttons corresponding to park, reverse, neutral, overdrive, drive, second and first shift positions for the transmission. Buttons 100 coact in known manner with a printed circuit board 102 to generate suitable electrical signals in response to respective depression of the buttons 100. Also present on front face 98a are two indicator lamps: fault indicator 101; and error indicator 103. These lamps are illuminated to indicate respective fault and error conditions in a manner that will be further detailed below.

Logic submodule 30b includes an electronic printed circuit board 104 suitably electrically connected to printed circuit 102 and suitably mounting a first plurality of connector terminals 106 and a second plurality of connector terminals 108. Connector terminals 106 coact with a pin-type plug 110 at the end of a cable 112. Cable 112 includes plugs 114 and 116 at its remote end for plugging receipt of plugs 90 and 94 so that plug 110 embodies the information from leads 86, 88 and 92. Connector terminals 108 coact with a pin-type plug 118. Plug 118 embodies the information from leads 120, 121, 122, 123, 124, 125, 126, 128 and 129. Lead 120 is associated with a switch 130 sensing the open or closed position of the driver's door of the vehicle; lead 121 is associated with a switch 132 sensing the presence or absence of a driver on the driver's seat of the vehicle; lead 122 senses the open or closed condition of the ignition switch 134 of the vehicle; leads 123 and 124 are connected to the negative and positive terminals of the vehicle battery 135 with a suitable fuse 136 in lead 123; lead 125 is connected to a speed sensor 137 which provides information with respect to the instantaneous speed which the vehicle is traveling; and lead 126 is connected with a switch 138 which is closed in response to movement of throttle lever 139 to its extreme open throttle position by a cable 140 connected in known manner to the accelerator assembly 14 of the vehicle.

Lead 128 is connected with brake switch 133 which senses whether or not the brake is actuated. Lead 129 is connected with seat belt switch 135 which senses whether or not the driver's seat belt is fastened.

The electric shift assembly is delivered to the vehicle manufacturer in the form of power module 28 and control module 30. During the assembly of the vehicle, the power module 28 is mounted on the transmission housing proximate the control levers 24 and 26 and the control module 30 is mounted in the instrument panel 10, whereafter plugs 90 and 94 are plugged into plugs 114 and 116 and plugs 110 and 118 are plugged into control module 30 to complete the assembly of the invention electric shift apparatus.

The mounting of power module 28 on the transmission housing is accomplished simply by passing bolts 38 through bosses 32b and 32c for threaded engagement with transmission housing bosses 20a and 20b, passing bolt 40 through lug 32d for threaded engagement with transmission housing lug 20c, and snapping snap fittings 60e and 72 respectively over ball fitting 22a on the free end of mode select lever 22 and a ball fitting 24a on the free end of kick-down lever 24. As the lever assembly 46 is connected to the mode select lever, lever sections 60a and 60b of lever 60 move telescopically and selectively relative to each other to provide the precise effective length of length 60 to allow positive snapping engagement of snap fitting 60e over ball 22a irrespective of manufacturing tolerances, whereafter nut 64 is tightened to lock the lever 60 in its precise adjusted position.

Installation of control module 30 in instrument panel 10 is affected simply by moving the control module from the rear of the panel into the opening 10a and fastening the module in place by the use of fasteners 96 or the like. Following the plugging of plugs 90 and 94 into plugs 114 and 116 and the plugging of plugs 110 and 118 into connector terminals 106 and 108, the system is operational and ready for use.

Figure 14:
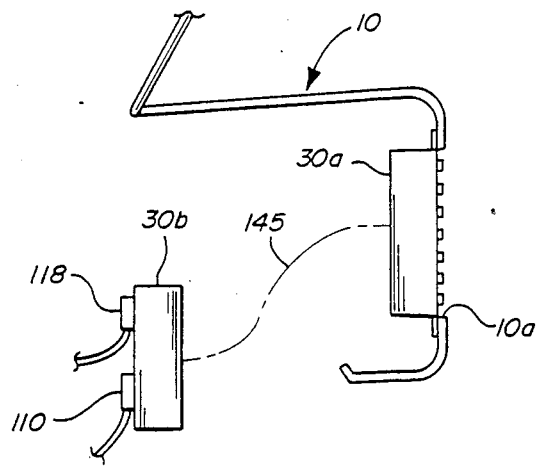
FIG. 14 is a view of a modified system for mounting the invention control module in the vehicle.

Alternatively, in situations where space immediately behind the fascia of the instrument panel is limited, submodules 30a and 30b may be designed and delivered as separate units with push-button submodule 30a mounted a previously described in opening 10a of the instrument panel or center console and logic submodule 30b mounted elsewhere in the general environment of the instrument panel and connected to push-button submodule 30a in known manner by suitable wiring. For example, as seen in FIG. 14, push-button submodule 30a may be mounted in instrument panel opening 10a and logic submodule 30b may be mounted in the general area behind and below the facia of the instrument panel 10 with the submodules interconnected by wiring seen generally at 145.

Figure 21:
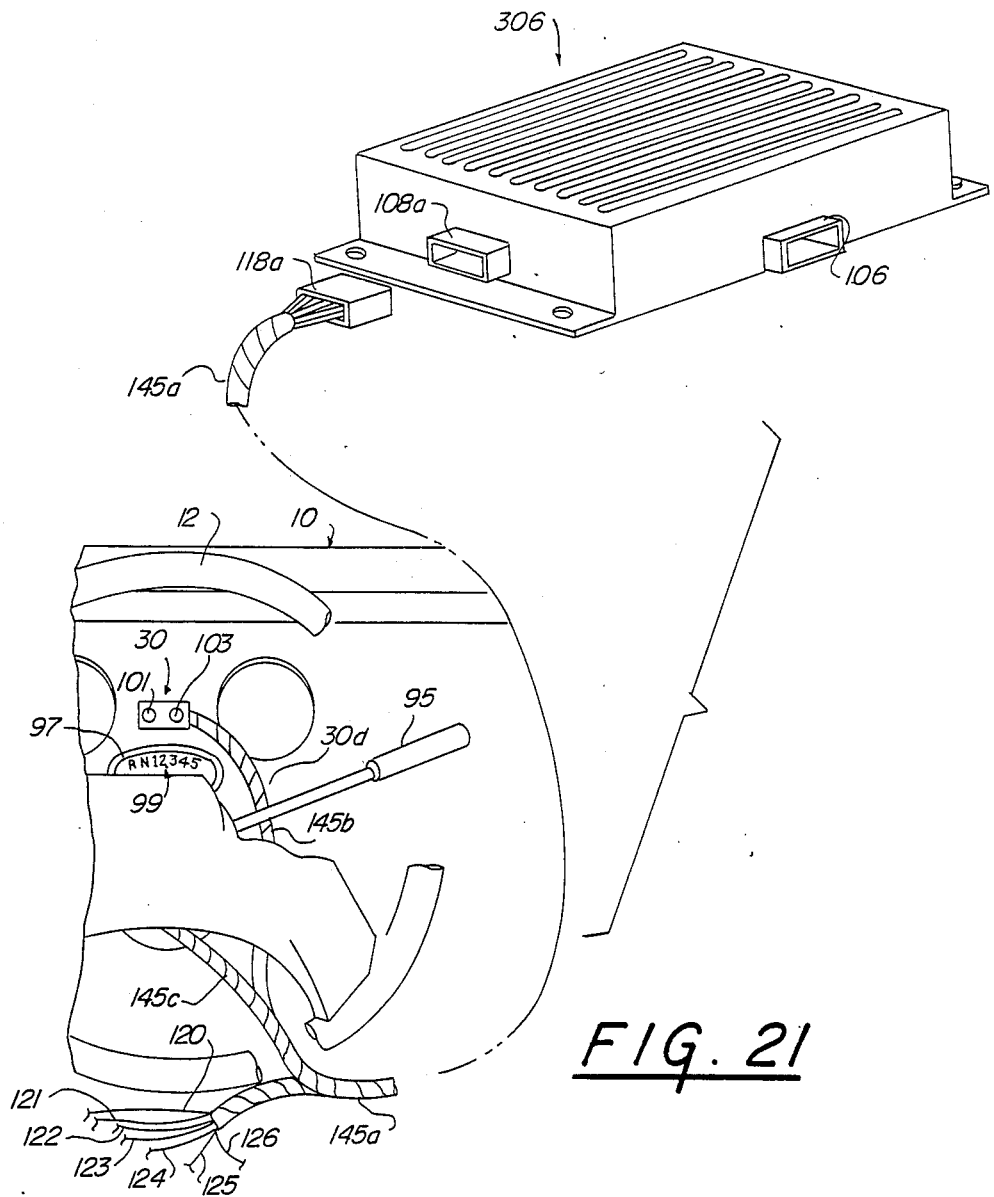
FIG. 21 a fragmentary perspective view of a motor vehicle embodying an alternate embodiment of the user input device of the present invention.

FIG. 21 illustrates an alternative embodiment of the user interface and control module 30. This alternative embodiment includes a gear selector assembly 30d, a control module 30c, and an instrument panel module 30e. Broadly considered, gear selector assembly 30d is adapted to be positioned in association with the steering column assembly of the motor vehicle; control module 30c is to be disposed behind the dash in the same manner as the disposal of submodule 30b previously described in conjunction with FIG. 14; and instrument panel module 30e is adapted to be mounted in the instrument panel of the motor vehicle.

Gear selector assembly 30d includes a gear selector lever 95 mounted for pivotal movement about one end and including a pointer 99; a quadrant member 97 carrying suitable indicia such as R, N, 1, 2, 3, 4, 5 corresponding to the positions of the associated transmission; and a plurality of leads associated with each of the quadrant positions R, N, 1, 2, 3, 4 and 5 and respectively representing circuits that are completed in response to movement of selector lever 95 to a respective position so that these leads respectively carry control signals respectively generated in response to movement of selector lever 95 through the various indicated positions. These leads may for example be embodied in a single cable 145b extending from quadrant member 97 to control module 30c and terminating in a suitable plug 118a for plugging receipt in a socket 108a in the housing of the control module 30c.

Figure 9:
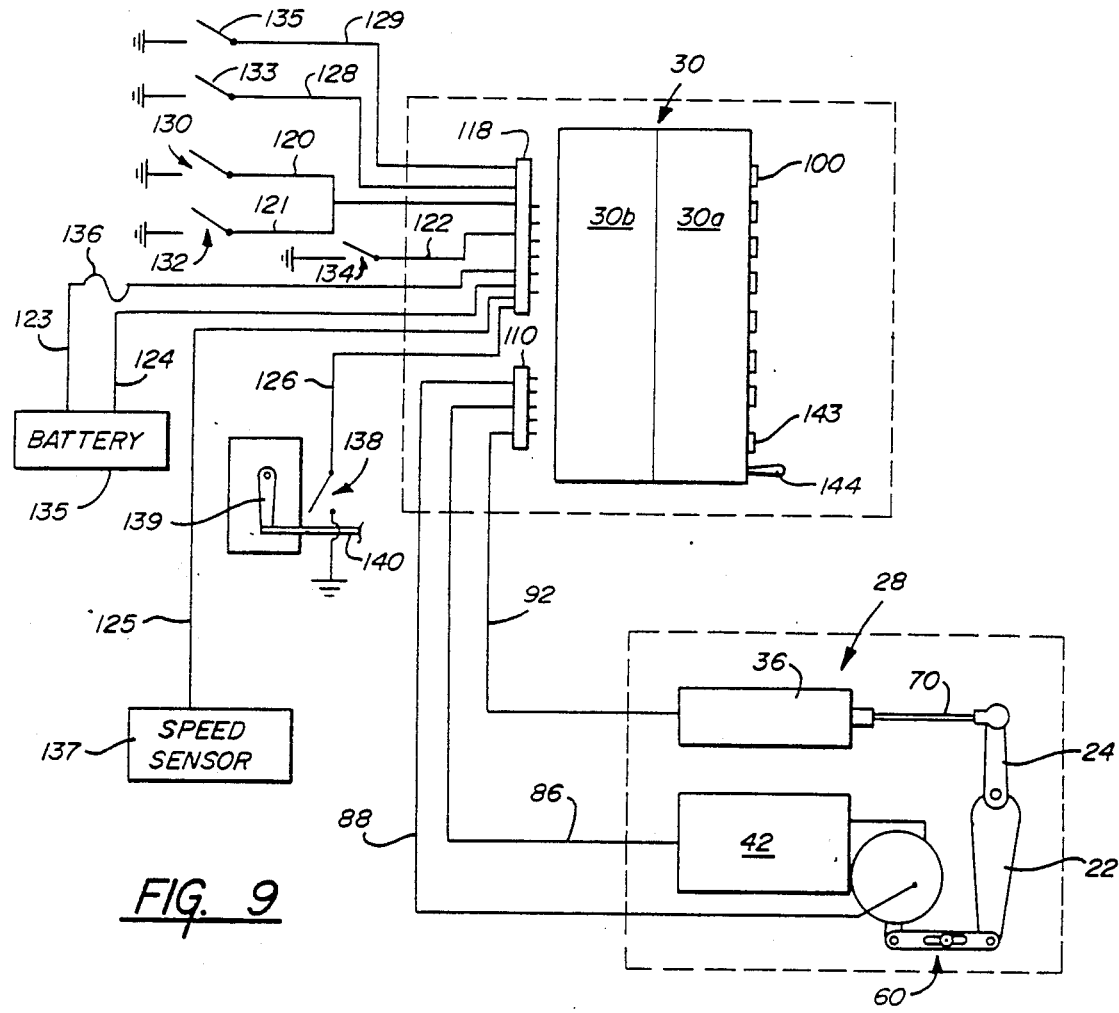
FIG. 9 is a circuit diagram for the invention electric shift apparatus.

Other leads to control module 30c are as previously described. These further leads include leads 120 to 126, which are coupled to various electrical components as previously illustrated in FIG. 9. Note that the output leads to indicators 101 and 103 run to instrument panel housing 30e via cable 145 in accordance with this embodiment of the invention rather than to the front face 98a of control module 30 as previously described. In this alternative embodiment, there is no need for the indicator lamps mounted on front face 98a of control module 30 for indicating the current gear. Rather the position of pointer 99 within quadrant 97 indicates the currently selected gear.

Figure 15:
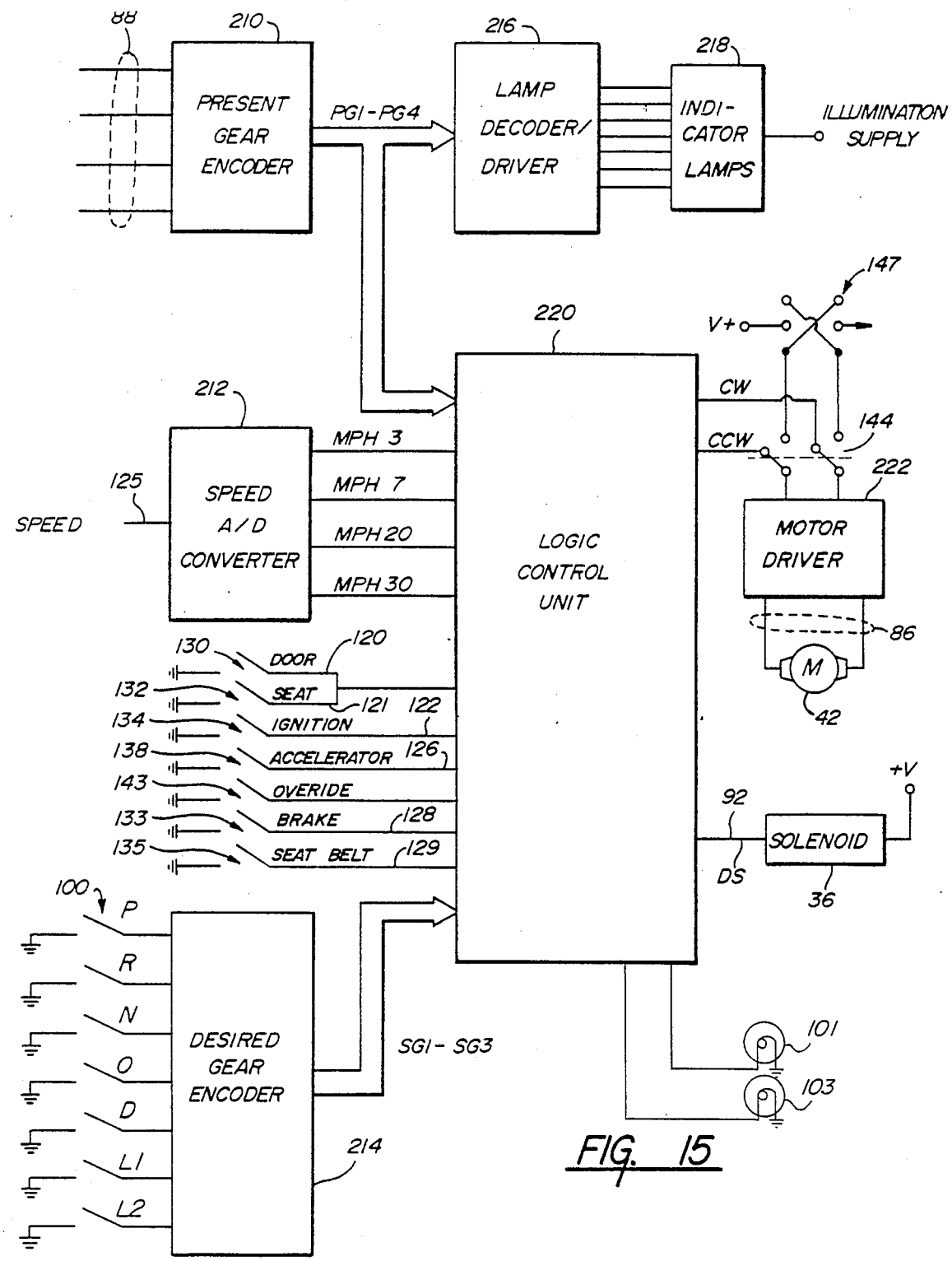
FIG. 15 a schematic view of the electrical control system of the present invention.

FIG. 15 illustrates a schematic block diagram of the electrical control system of the present invention. This block diagram includes present gear encoder 210, speed analog-to-digital converter 212, desired gear encoder 214, lamp decoder/driver 216, indicator lamps 218, logic control unit 220 and motor driver circuit 222.

Present gear encoder 210 is connected to the lines 88 which are output of the encoder assembly 73, described above. Present gear encoder 210 includes one or more integrated circuits to encode the output signal from encoder assembly 73 into four signals PG1 to PG4. This encoding takes place, for example, in accordance with the coding table listed at Table 1.

TABLE 1

|  | PG1 | PG2 | PG3 | PG4 |
| --- | --- | --- | --- | --- |
| Park | 0 | 0 | 0 | 1-0 |
| Reverse | 1 | 0 | 0 | 1-0 |
| Neutral | 1 | 1 | 0 | 1-0 |
| Overdrive | 0 | 1 | 0 | 1-0 |
| Drive | 0 | 1 | 1 | 1-0 |
| Low1 | 1 | 1 | 1 | 1-0 |
| Low2 | 1 | 0 | 1 | 1-0 |

Figure 20:
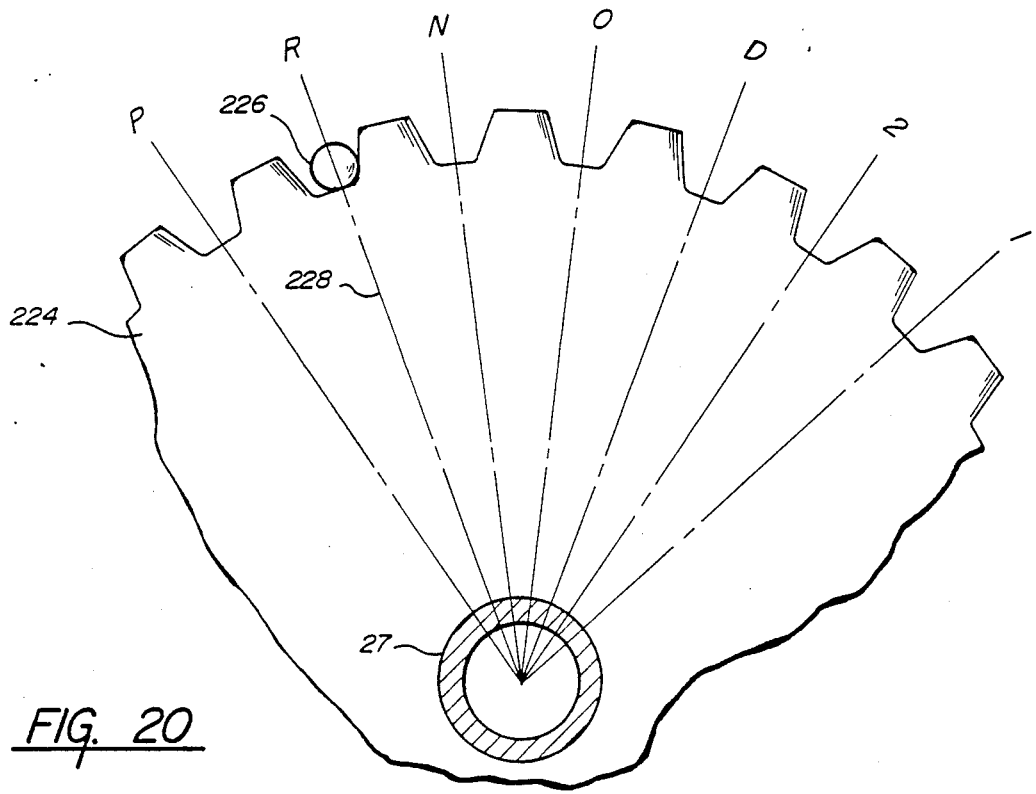
FIG. 20 is a somewhat schematic view of a roostertail member embodied in the transmission of the vehicle and illustrating the operation of the encoder mechanism to indicate the exact center of the range for each gear selected.

Each unique combination of signals PG1, PG2 and PG3 indicates the angular range for a corresponding gear. FIG. 20 illustrates a roostertail control member 224 of known form connected to tubular shaft 27 and positioned within the transmission housing. As seen in FIG. 20, the signal PG4 is used to indicate the exact center of any particular gear range as represented by positioning of the usual spring loaded follower 226 in the precise dead center of the valley of the roostertail corresponding to the particular gear being selected. The encoder assembly 73 causes signal PG4 to change from "1" to "0" when the exact center of the angular range of the selected gear is reached. When this transition in PG4 is detected, then the signals PG1, PG2 and PG3 are latched into the logic. This encoding technique ensures the mode select lever 22 is precisely positioned when the DC electric motor 42 is stopped. As a consequence the transmission is reliably positioned in the desired gear at the bottom of the valley of the roostertail corresponding to the desired gear. For example, as seen in FIG. 20, when R is selected by the vehicle operator, the described encoding technique ensures that the follower 226 comes to rest at the angular position 228 corresponding to bottom dead center of the roostertail valley corresponding to the reverse gear mode of the transmission.

Speed analog-to-digital converter 212 receives an analog signal indicative of speed on line 125. Speed analog-to-digital converter 212 generates an output signal on one or more of the output lines MPH3, MPH7, MPH20 and MPH30, depending upon the magnitude of the analog speed signal.

Figure 16:
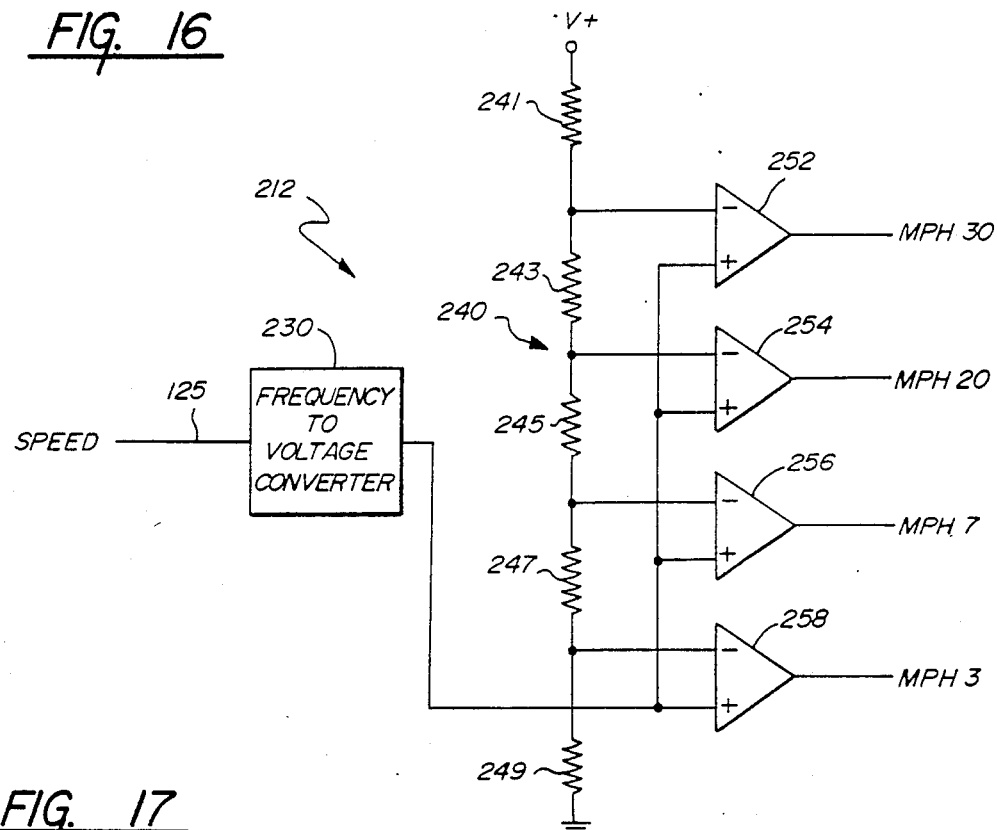
FIG. 16 is a more detailed schematic view of the speed analog-to-digital converter illustrated in FIG. 15.

FIG. 16 illustrates in schematic form the preferred construction of speed analog-to-digital converter 212. In accordance with the preferred embodiment the speed signal comes from an existing sensor on the vehicle which generates an oscillating signal having a frequency proportional to the vehicle speed. The speed signal is applied to a frequency-to-voltage converter 230 and then to the positive input of each of a set of comparators 252, 254, 256 and 258. A voltage divider circuit 240 comprising resistors 241, 243, 245, 247 and 249 is connected between the positive supply voltage and ground. The node between resistors 241 and 243 is connected to the negative input of comparator 252; the node between resistors 243 and 245 is connected to the negative input of comparator 254; the node between resistors 245 and 247 is connected to the negative input of comparator 254; and the node between resistors 247 and 249 is connected to the negative input of comparator 258. Each of these comparator circuits 252 to 258 receives a reference voltage for comparison to the output from frequency-to-voltage converter 230. If the output from frequency-to-voltage converter 230 is greater than the reference voltage applied to comparator 252, this indicates a vehicle speed of greater than 30 miles per hour. Accordingly, the output of comparator 252 is the MPH30 signal. Similarly, comparator 254 generates a signal at output MPH20 when the voltage at the output of frequency-to-voltage converter 230 indicates a vehicle speed of greater than 20 miles an hour. Comparator 256 generates an output MPH7 when the input indicates a vehicle speed of greater than seven miles per hour. Lastly, comparator 258 generates an output MPH3 when the speed input signal indicates a vehicle speed of greater than three miles per hour. Each of these four digital speed signals are supplied to logic control unit 220, to be used in a manner which will be further disclosed below.

Desired gear encoder 214 is coupled to the plurality of push-buttons 100 employed to select the desired gear. Desired gear encoder 214 includes one or more integrated circuits which encode the last actuated switch 100 into a three-bit signal on lines SG1 to SG3. This encoding takes place, for example, in accordance with the coding table listed at Table 2.

TABLE 2

|  | SG1 | SG2 | SG3 |
| --- | --- | --- | --- |
| Park | 1 | 1 | 1 |
| Reverse | 1 | 1 | 0 |
| Neutral | 1 | 0 | 1 |
| Overdrive | 1 | 0 | 0 |
| Drive | 0 | 1 | 1 |
| Low1 | 0 | 1 | 0 |
| Low2 | 0 | 0 | 1 |

A bus of these three lines SG1 to SG2 is supplied from desired gear encoder 214 to logic control unit 220. This bus indicates to logic control unit 220 the desired transmission state selected by the operator.

Desired gear encoder 214 is responsive the to push buttons 100 and generates the encoded desired gear signal on lines SG1 to SG3. Because it is possible for the operator to inadvertently or deliberately press more that one of the push buttons, desired gear encoder provides a priority to some desired gears over other desired gears. In accordance with the preferred embodiment of the present invention, the order of priority is: park; reverse; neutral; overdrive; drive; low2; and low1. In accordance with one embodiment of the present invention desired gear encoder 214 is embodied by a Fairchild 9318 priority encoder. Coupling of the input leads from the plural push-buttons 100 to the appropriate inputs of this device results in the generation of the output code corresponding to the highest priority push-button 100 pressed.

Lamp decoder/driver 216 receives the encoded present gear signal on the bus including the lines PG1 to PG4. Lamp decoder/driver 216 generates a signal to illuminate a single light of indicator lamps 218. In accordance with the preferred embodiment of the present invention each of the lamps of indicator lamps 218 is associated with one of the push-button switches 100. In particular, it is desirable that push-buttons 100 comprise lighted push-button switches with the indicator lamps enclosed therein. The individual indicator lamps are preferably connected to the illumination supply in a manner that enables the intensity of these lamps to be adjusted in accordance with the adjustment of the intensity of the interior instruments.

Figure 17:
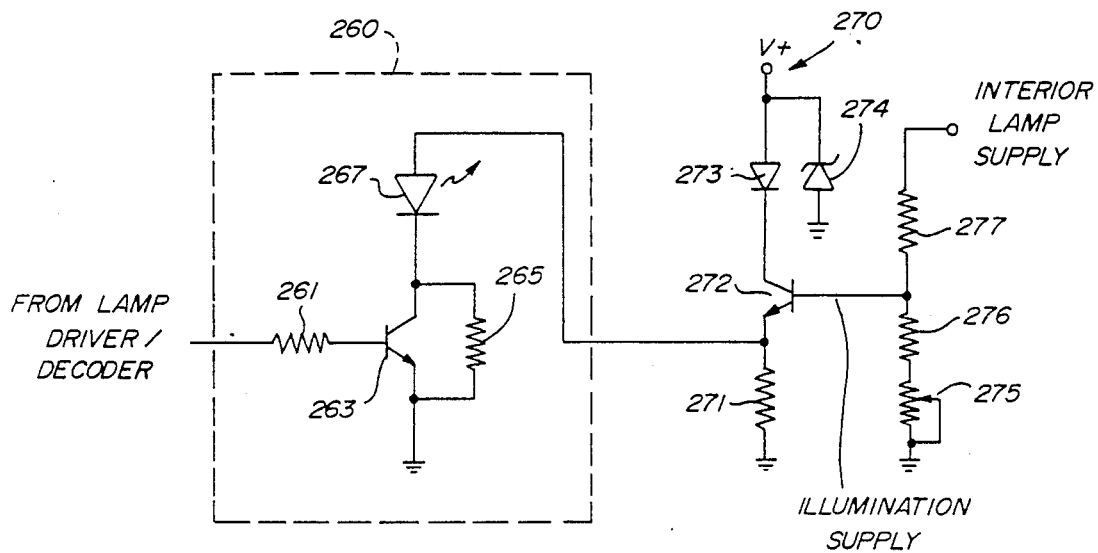
FIG. 17 is a schematic view of a typical indicator lamp circuit including its connection to the variable illumination supply.

FIG. 17 illustrates circuit 260 of a typical indicator lamp 267. In this illustration indicator lamp 267 is a light emitting diode. A resistor 261 is connected to lamp decoder/driver 216 for supplying a bias current to the base of transistor 263. When transistor 263 is turned on lamp 267 shines with a first brightness. When transistor 263 is turned off resistor 265 carries the current through lamp 267, so that lamp 267 is illuminated with a second, lower intensity. The voltage supplied to lamp 267 comes from power supply 270. The interior lamp supply is applied to a voltage divider including potentiometer 275, and resistors 276 and 277. The voltage appearing at the node between resistors 276 and 277 depends upon the setting of potentiometer 275. This voltage supplies a base current to transistor 272 which is connected in an emitter follower circuit. The emitter current from transistor 272 flows through the selected lamp and through resistor 271. Diode 273 provides reverse voltage protection for transistor 272. Zener diode 274 supplies over voltage protection for transistor 272. In accordance with the preferred embodiment, adjustment of the instrument intensity via potentiometer 275 adjusts the intensity of the illumination of the indicator lamps 218.

Additional switches are connected to logic control unit 220. These include door switch 130, which indicates the open/closed status of the driver's door, seat switch 132 indicating whether or not the driver's seat is occupied, ignition switch 134 indicating the status of the ignition switch, accelerator switch 138 which indicates the full depression of accelerator pedal 138 and override switch 143. Brake switch 133 indicates the depression of the brake pedal and seat belt switch 135 indicates the closure of the driver's seat belt. Logic control unit 220 receives the above described input signals and generates three output signals. These include the clockwise motor drive signal and the counter-clockwise motor drive signal which are connected to motor driver circuit 220. In addition a down shift signal 92 is connected to solenoid 36 for effecting the down shifting of the transmission via kick-down lever 24.

In use various input signals, such as described above and illustrated in FIGS. 9 and 15, are supplied to logic control unit 220. Logic control unit 220 is configured to receive these input signals and generate the necessary drive signals to motor 42 and solenoid 36 for providing the selection of the desired gear. Logic control unit 220 is preferably constructed of a programmed microprocessor circuit. It is also possible to construct logic control unit 220 in hardware logic in a programmable logic array or a gate array. The following description of the action of logic control units 220 is made in relation to Boolean equations. Those skilled in the art of the electronic controls would understand that it is equally possible to perform these Boolean operations with a programmable microprocessor circuit or with the logic circuits of a programmable logic array or gate array.

The operation of logic control unit 220 will now be described. Firstly, the various input signals are formed into a set of logic signals. The signals SG1 to SG3 are decoded into a set of signals whose state is selected by the depressed push-button 100; PARK, RVRS, NTRL, OVDR, DRVE, LOW1 AND LOW2. One of these signals, corresponding to the desired gear selected by the depressed push-button, is a logic "1" while the other of these signals are a logic "0". Similarly the encoder signals PG1 to PG4 permit generation of a set of logic signals PGP, PGR, PGN, PGO, PGD, PGL1 and PGL2, one of which is active to indicate the present gear and the others of which are inactive. This encoding and decoding technique is employed to reduce the number of lines required between the various circuits and to reduce the number of input lines to be connected to logic control unit 220. Logic control unit 220 receives the speed logic signals MPH3, MPH7, MPH20 and MPH30 from speed analog-to-digital converter 212. Logic control unit 220 forms signals from the additional inputs including DOOR indicating the opened/closed status of the driver's door via door switch 130, SEAT indicating whether or not the driver's seat is occupied via seat switch 132, IGN indicating the status of the ignition switch, ACC indicating whether or not the accelerator switch 138 is closed, OVRD indicating override via switch 143, BRAKE indicating depression of the brake pedal via switch 133 and SBELT indicating the closure of the driver's seat belt via switch 135.

Logic control unit 220 serves to compare the inputs indicating the desired gear with the inputs indicating the present gear. If they differ, then logic control unit 220 generates an output signal to motor 42 to rotate the motor until the present gear matches the desired gear. This process includes an indication of which shifts are upshifts (counter-clockwise motor rotation) and which are down shifts (clockwise motor rotation) according to the following Boolean equations:

UP1 = PGL1
UP2 = PGL2 and Not (LOW1)
UP3 = PGD and (not (LOW2) and Not (LOW1))
UP4 = PGO and ( NTRL or RVRS or PARK )
UP5 = PGN and ( RVRS or PARK )
UP6 = PGR and PARK
UPSHFT = UP1 or UP2 or UP3 or UP4 or UP5 or UP6
DNSHFT = Not (UPSHFT)

Thus an up shift is required if the present gear is low1 (Up1), or the present gear if low2 and low1 is not requested (UP2), or the present gear is drive and neither low1 nor low2 are requested (UP3), or the present gear is overdrive and either neutral, reverse or park is selected (UP4), or the present gear is neutral and either reverse or park is selected (UP5), or the present gear is reverse and park is selected. A down shift is requested if none of the intermediate states are satisfied, that is the inverse of UPSHFT.

Two motor control signals CCW and CW are generated when the signals ENABLE and OK2SHFT are active and the respective UPSHFT or DNSHFT is active and shown below.

CCW=ENABLE and OK2SHFT and UPSHFT
CW=ENABLE and OK2SHFT and DNSHFT

The ENABLE signal generally requires the desired gear to differ from the present gear and certain safety conditions to be satisfied. As shown below, ENABLE is inactive when the desired gear is the same as the present gear.

ENABLE=GOLOW1 or GOLOW2 or GODRVE or GOOVDR or GONTROL or GORVRS or GOPARK

These intermediate signals are formed as follows:
GOLOW1=LOW1 and Not (PGL1) and Not(MPH30)
GOLOW2=LOW2 and Not(PGL2) and Not(MPH20)
GODRVE=DRVE and Not(PGD)
GOOVDR=OVDR and Not(PGO)
GONTRL=NTRL and Not(PGN)
GORVRS=RVRS and Not(PGR) and Not(MPH7)
GOPARK=( PARK and Not (PGP) and Not(MPH3) ) or ( ( ( Not(IGN) or ( Not (DOOR) and Not(SEAT) ) ) and Not(PGP) and Not(MPH3) and Not(OVRD) ) )

Thus the logic control unit 220 does not permit a shift into low1 when the speed is in excess of 30 miles per hour, and likewise does not permit a shift to low2 if in excess of 20 miles per hour, to reverse if in excess of 7 miles per hour, or to park if in excess of 3 miles per hour. The second term in GOPARK automatically shifts to park if the ignition is switched off (Not(IGN)), or if the door is opened (Not(DOOR)) and the seat is empty (Not(SEAT)), the present gear is not park (Not(PGP)), the speed is not greater than 3 miles per hour (Not(MPH3)), and neutral override is not selected (Not(OVRD)).

The signal OK2SHIFT is a safety lockout signal. It is formed as follows:

OK2SHFT=( (IGN and SEAT) or OVRD) and Not (PGR and MPH7)

Thus OK2SHFT permits shifts if the ignition switch is enabled and the driver's seat is occupied, or if a gear is selected and the override switch 143 is activated. In either event shifts are not permitted if the transmission is currently in reverse gear and the vehicle speed is above 7 miles per hour. If desired OK2SHFT may also require connection of the driver's seat belt to enable any shift via the SBELT signal. Also, it may be desired to require depression of the brake to leave PARK gear by adding a term ( Not(PGP) and Not(BRAKE) ) to the equation for OK2SHFT.

It is feasible to combine the priority encoding operation of desired gear encoder 214 with the logic functions of logic control unit 220 in a single logic unit. This is achieved with an additional layer of priority determination logic as follows. The desired gear signals PARK, RVRS, NTRL, OVDR, DRVE, LOW1 and LOW2 are generated in parallel as before with the understanding that more than one of these signals may be a logic "1" indication the depression of more than one of push-buttons 100. The signals GOLOW1, GOLOW2, GODRVE, GOOVDR, GONTRL, GORVRS and GOPARK are formed as previously indicated. This includes the safety lockout features previously described.

The priority function is achieved as follows. The raw selected gear outputs PARK, RVRS, NTRL, OVDR, DRVE, LOW1 and LOW2 are combined with the signals GOLOW1, GOLOW2, GODRVE, GOOVDR, GONTRL, GORVRS and GOPARK. This process involves the formation of three intermediate signals A1LOGIC, A2LOGIC and A3LOGIC as follows:

| | |
|---|---|
| A1LOGIC = | (GORVRS and NOT(PARK)) or (GONTRL and Not(RVRS) and Not(PARK)) or (GOLOW2 and Not(DRVE) and Not(OVDR) and Not(NTRL) and Not(RVRS) and Not(PARK)) or (GOLOW1 and Not(LOW2) and Not(DRVE) and Not(OVDR) and Not(NRTL) and Not(RVRS) and Not(PARK)) |
| A2LOGIC = | (GONTRL and Not(PARK) and Not(RVRS)) or (GOOVDR and Not(NTRL) and Not(RVRS) and Not(PARK)) or (GODRVE and Not(OVDR) and Not(NTRL) and Not(RVRS) and Not(PARK)) or (GOLOW2 and Not(DRVE) and Not(OVDR) and Not(NTRL) and Not(RVRS) and Not(PARK)) |
| A3LOGIC = | GOLOW1 and Not(LOW2) and Not(DRVE) and Not(OVDR) and Not(NTRL) and Not(RVRS) and Not(PARK) |

From these intermediate signals a set of prioritized desired gear signals PARKZ, RVRSZ, NTRLZ, OVDRZ, DRVEZ, LOW1Z and LOW2Z are formed as follows:

| | |
|---|---|
| PARKZ = | Not(A1LOGIC) and Not(A2LOGIC) and Not(A3LOGIC) |
| RVRSZ = | (A1LOGIC) and Not(A2LOGIC) and Not(A3LOGIC) |
| NTRLZ = | (A1LOGIC) and (A2LOGIC) and Not(A3LOGIC) |
| OVDRZ = | Not(A1LOGIC) and (A2LOGIC) and Not(A3LOGIC) |
| DRVEZ = | Not(A1LOGIC) and (A2LOGIC) and (A3LOGIC) |
| LOW2Z = | (A1LOGIC) and (A2LOGIC) and (A3LOGIC) |
| LOW1Z = | (A1LOGIC) and Not(A2LOGIC) and (A3LOGIC) |

This table is constructed so that one and only one of these prioritized desired gear signals PARKZ, RVRSZ, NTRLZ, OVDRZ, DRVEZ, LOW1Z and LOW2Z is generated if any push-button 100 is depressed regardless of how many of push-buttons 100 are depressed. This technique implements the same heirarchy of priority as previously described. The signal ENABLE is then formed from the set of prioritized desired gear signals PARKZ, RVRSZ, NTRLZ, OVDRZ, DRVEZ, LOW1Z AND LOW2Z as follows:

| | |
|---|---|
| ENABLE = | (PARKZ and Not(PGP)) or (RVRSZ and Not(PGR)) or (NTRLZ and Not(PGN)) or (OVDRZ and Not(PGO)) or (DRVEZ and Not(PGD)) or (LOW1Z and Not(PGL1)) or |

-continued (LOW2Z and Not(PGL2))

Other aspects of the logic control function are as previously described.

Logic control unit 220 controls error lamp 103. Error lamp 101 is illuminated when an improper shift is requested. As noted above there are various lock out conditions employed to prevent a shift, most notably the request to shift to a gear while the vehicle speed exceeds a predetermined limit for that gear. Error lamp 103 is illuminated when at least one of the desired gear signals PARK, RVRS, NTRL, OVDR, DRVE, LOW1 and LOW2 is generated and ENABLE is not generated. Thus ERROR is formed as follows:

ERROR = ( PARK or RVRS or NTRL or OVDR or DRVE or LOW1 or LOW2 ) and Not(ENABLE)

The error lamp 103 is illuminated when the ERROR signal is generated.

Figure 18:
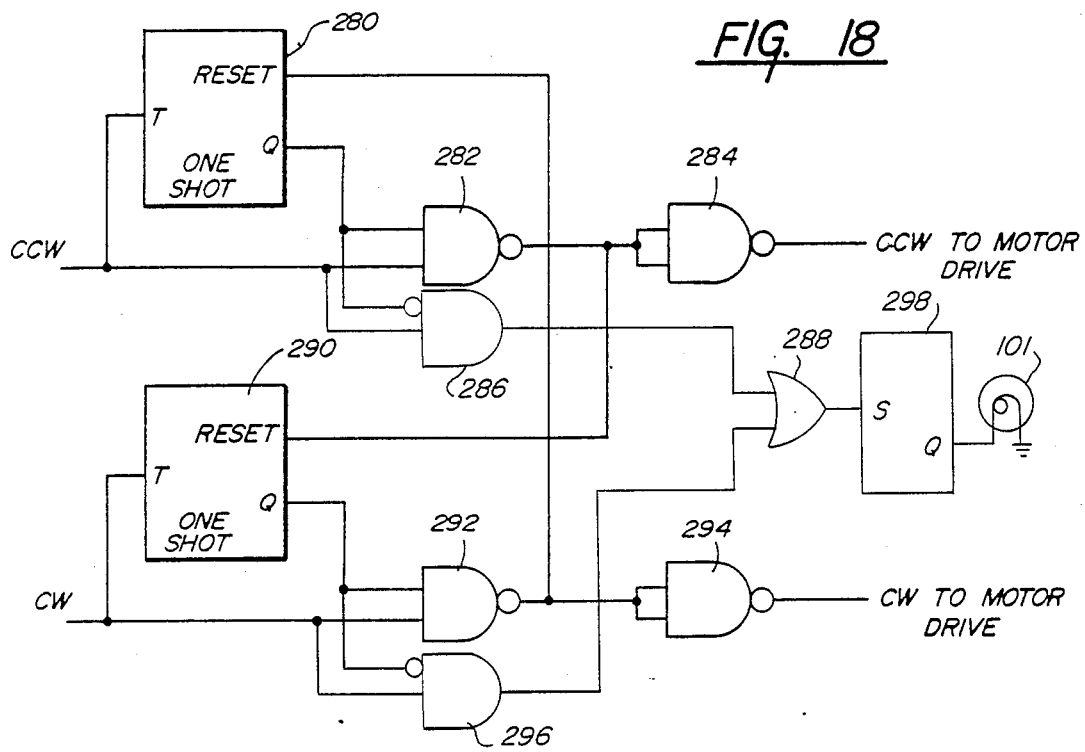
FIG. 18 is a schematic view of the timing circuit which ensures that the motor control signals are not generated for longer than a predetermined period of time.

The clockwise motor drive signal CW and the counter-clockwise motor drive signal CCW are generated by logic control unit 220 in accordance with the above Boolean equations. These signals are then conditioned via a one shot circuit before being applied to motor driver circuit 222. These one shot circuits are illustrated in FIG. 18. The counter-clockwise motor drive signal CCW is applied to the trigger input of one shot circuit 280 and one input of gate 282. Upon generation of this counter-clockwise motor drive signal CCW the state of one shot 280 is toggled to enable gate 282. At the same time, the output of NAN gate 282 is applied to the reset input of one shot 290, insuring that NAND gate 292 is cut off and the clockwise motor drive signal CW is inhibited. This signal is inverted via gate 284 and then applied to the motor driver circuit 222 in the manner illustrated in FIG. 15. When a predetermined period of time has elapsed one shot 280 reverses state. This serves to disable NAND gate 282 and stop the generation of the counter-clockwise motor drive signal CCW. This also removes the input to reset one shot 290, thereby permitting later generation of the clockwise motor drive signal CW. The length of time of one shot circuit 280 is set to be longer than the longest time for ordinary shifting. Thus if this time is exceeded some error condition has resulted and it is best to remove the motor drive from motor 42. A similar one shot circuit 290 operates on the clockwise motor drive signal CW utilizing NAND gate 292 and 294. The output of NAND gate 292 is also applied to the reset input of one shot 280 insuring that NAND gate 282 is cut off when the clockwise motor drive signal CW is generated. This prevents simultaneous generation of the clockwise motor drive signal CW and the counter clockwise motor drive signal CCW.

Logic control unit 220 controls fault lamp 101. Fault lamp 101 is illuminated when either of the one shot circuits 280 or 290 is tripped while the corresponding motor drive signal is active. This indicates that the transmission has taken longer than the period of the respective one shot circuit interval to reach the desired gear, indicating some sort of fault in the system. As illustrated in FIG. 18, the Q output of one shot 280 is connected to an inverting input of AND gate 286. The counter-clockwise motor drive signal CCW in connected to and noninverting input of AND gate 286. Thus AND gate 286 produces an output only if one shot 280 times out while the counter-clockwise motor drive signal CCW is active. AND gate 296 is similarly connected to the Q output of one shot 290 and clockwise motor drive signal CW to produce an output only if one shot 290 times out while the clockwise motor drive signal CW is active. On the occurrence of either time out OR gate 288 trips flip flop 298 to illuminate fault lamp 101. This presents an indication of the fault condition to the operator.

A pair of switches enable the transmission to be shifted manually. Auto/Manual switch 144 switches between the signals generated by logic control unit 220 and jog switch 147. In normal use auto/manual switch 144 is in the auto position illustrated in FIG. 15 in which the clockwise motor control signal CW and the counter clockwise motor control signal CCW generated by logic control unit 220 are coupled to motor driver circuit 222. In this position logic control unit 220 controls motor driver circuit 222 in accordance with the principles of the present invention explained herein. When auto/manual switch 144 is in the manual position, signals from jog switch 147 are coupled to motor driver circuit 222.

This jog switch 147 is preferably a double pole double throw momentary contact switch with a center off position. Momentary actuation of jog switch 147 in one direction causes generation of the counter-clockwise motor drive signal CW, in the same manner as generated by logic control unit 220. Similarly, momentary actuation of jog switch 147 in the opposite direction generates the counter-clockwise motor drive signal CCW. These signals are applied to motor driver circuit 122 in the manner similar to the signals received from logic control unit 220. Jog switch 147 thus permits the user of the motor vehicle to change the state of the automatic transmission in the event of some failure of the electrical control system.

Figure 19:
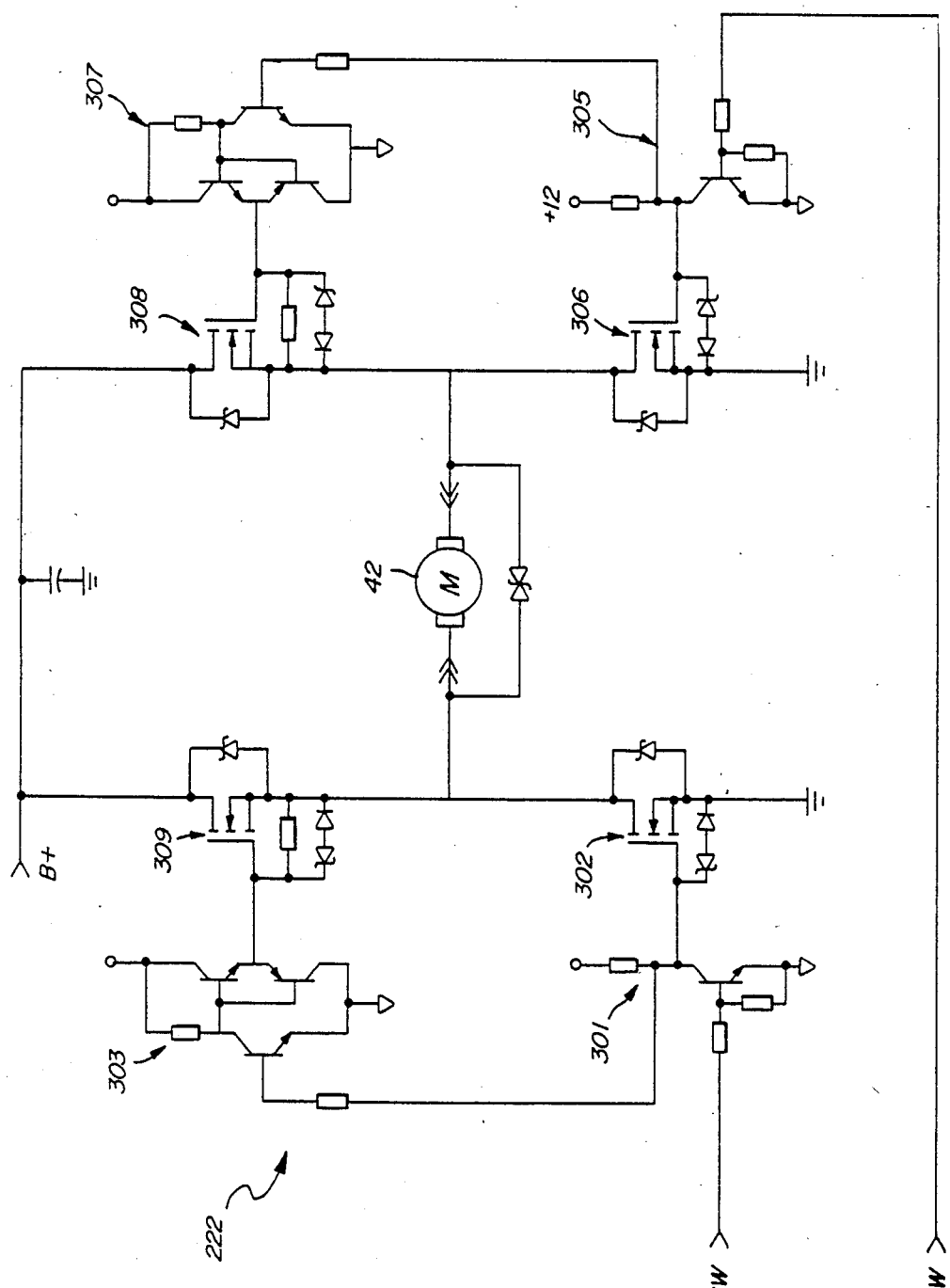
FIG. 19 is a schematic diagram of the motor drive circuit.

Motor driver circuit 222 is illustrated in detail in FIG. 19. The counter-clockwise motor drive signal CCW is applied to inverter 301. The output of inverter 301 is applied to switch 302 and to inverter 303. The output of buffer 303 is applied to switch 304. In a similar manner the clockwise motor control signal CW is applied to the input of inverter 305. The output of inverter 305 is applied to switch device 306. The output of inverter 305 is also applied to the input of inverter 307, which supplies the input to switch device 308.

Motor 42 is connected in an H bridge circuit between switch devices 302, 304, 306 and 308. Both clockwise motor drive signal CW and counter-clockwise motor drive signal CCW are normally inactive at a low voltage. Thus the output of inverter 301 is high and switch device 302 is conductive and switch device 304 is not conductive. Similarly, switch device 306 is normally conductive and switch device 308 is normally not conductive. Thus both terminals of motor 42 are connected to ground.

Upon receipt of an active counter-clockwise motor drive signal CCW inverter 301 switches states. Thus switch device 304 is turned on and switch device 302 is turned off. Because switch device 306 remains on, a current flows through motor 42 in a first direction through switch devices 304 and 306. When the desired shift position is reached, counter-clockwise motion drive signal CCW returns to the inactive low state. Thus switch device 302 is turned on and switch device 304 is turned off. Dynamic braking is achieved because both terminals of motor 42 are connected to ground (note switch device 306 has remained conductive during this sequence).

When clockwise motor drive signal CW is active, switch device 306 is turned off and switch device 308 is turned on. This causes a current to flow through motor 42 in the opposite direction through switch device 308 and switch device 302. Likewise when the clockwise motor drive signal CW ceases motor 42 is dynamically braked by both terminals being connected to ground.

Thus motor 42 is controlled to rotate clockwise or counter-clockwise in accordance with the signal supplied from logic control unit 220. Motor control circuit 222 illustrated in FIG. 19 also includes a feature for dynamically breaking motor 42 when neither the counter-clockwise motor control signal CCW nor the clockwise motor control signal CW is generated.

As soon as the instantaneous encoder signal transmitted by pick-up device 76 matches the signal generated by the specific depressed push button, logic control unit 220 of control module 10 functions to deenergize and brake the motor so that the mode select lever 22, and thereby the transmission, is stopped precisely in the selected shift position. If the lever 60 construction of FIG. 13 is employed, springs 64,65 coact with piston 60i to ensure that the internal detent controlled by lever 22 does not hang up on a crest of the known roostertail in the transmission but that, rather, the detent is moved to a precise shift position in which it is firmly seated in a notch or valley of the roostertail.

If at any time the operator desires to downshift the transmission as, for example, in a passing situation, the accelerator pedal 14 is fully depressed to close switch 138. A signal from the closed switch 138 is transmitted to logic control unit 220 by lead 126 where it is amplified by a buffer device 142 carried by printed circuit 104 and transmitted in amplified form through lead 92 to solenoid 36 which is thereby energized to retract the plunger of the solenoid and pivot downshift lever 24 in a counter-clockwise direction, as viewed in FIG. 9, to effect the desired downshifting of the transmission.

As previously described, the invention system would also preferably include illumination means for the push buttons 100 with the intensity of the illumination controlled by the usual dash dimmer and with the button corresponding to the present gear being illuminated brighter than the remaining buttons to provide a ready indication of the instantaneous position of the transmission. An override push button 143 is also provided as a part of push button submodule 30a. Override push button 143 allows the selection of any gear when it is necessary for the seat to be empty and the vehicle to be in a gear other than PARK, for example, during vehicle tune-up, vehicle car wash, et cetera.

Figure 10:
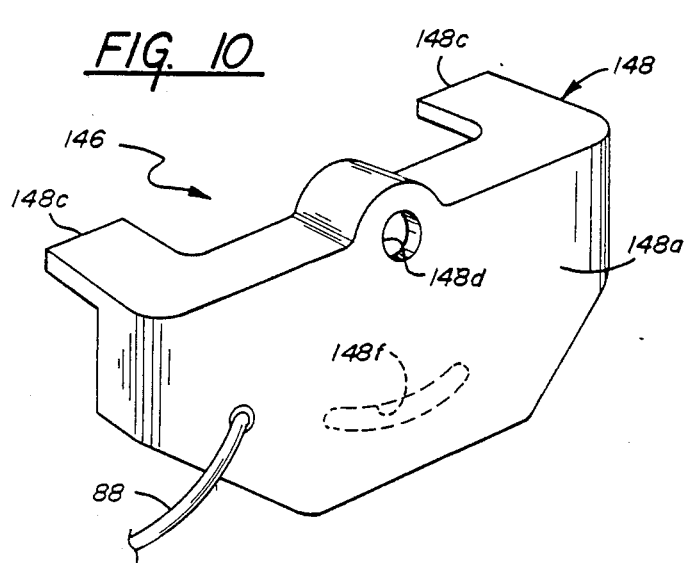
FIGS. 10, 11 and 12 are views of an alternate form of encoder mechanism for use in the invention electric shift apparatus.
Figure 11:
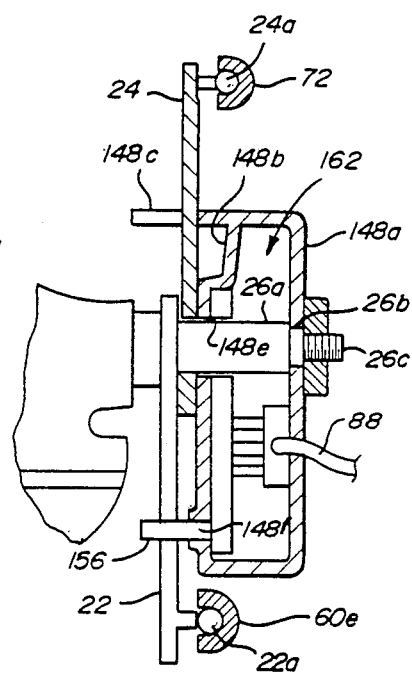
Figure 12:
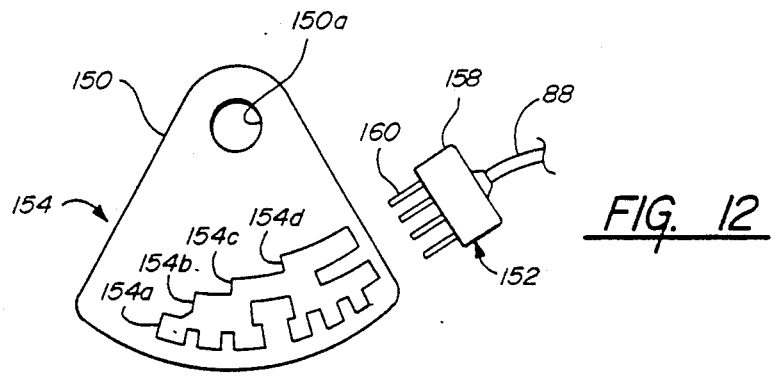

An alternate form of encoder assembly is shown in FIGS. 10-12. In this arrangement, the encoder assembly, rather than being provided within the sealed cavity 78 of the speed reduction unit 44, is provided as an independent unit 146 adapted to be fitted over the mode select lever 11 and to move with that lever so as to constantly sense the position of that lever and thereby sense the shift position of the transmission.

Encoder assembly 146 includes a housing 148, an encoder member 150, and a pick-up device 152.

Housing 148 may be formed of any suitable rigid material and includes an outer wall 148a, an inner wall 148b, flange portions 148c, an aperture 148d in outer wall 148a, an aperture 148e in inner wall 148b, and an arcuate slot 148f in inner wall 148b. In this embodiment, the central shaft 26 on which the kick-down lever 24 is mounted is extended to provide a shank portion 26a, shoulder portion 26b, and a threaded end portion 26c.

Encoder member 150 is arcuate and includes coded indicia 154 provided on tracks 154a, 154b, 154c and 154d generally corresponding to tracks 80a, 80b, 80c and 80d on encoder wheel 74. Pins 156 project from the face of encoder member 150 opposite the face on which indicia 154 is provided.

Pick-up device 152 includes a body portion 158 and resilient fingers 160 for coaction with the coded indicia on encoder member 150.

Encoder member 150 is positioned within the hollow interior 162 of housing 148 with pins 156 passing sealingly through arcuate slot 148f, and pick-up device 152 is positioned on the inner face of outer housing wall 148a with fingers 160 is coacting relation to the coded indicia on encoder member 150.

Encoder assembly 146 is fitted over shaft 26 with housing aperture 148e positioned on shank portion 26a, aperture 150a of encoder member 150 positioned on shank 26a, outer wall 148a positioned on shoulder 26b, and a nut 4 engaging threaded end portion 26c and seating against the annular shoulder between shaft portions 26b and 26c so as to preclude axial displacement of encoder assembly 146 relative to shaft 26 but allow rotation of the shaft relative to encoder assembly 146. Rotation of the encoder assembly is prevented by engagement of flange portions 148c with suitable portions on the transmission housing with kick down lever 24 disposed between spaced flanged portions 148c and pivotal in the space provided between the flange portions. Pins 156 snugly engage the opposite side edges of mode select lever 22 so that encoder member 150 moves positively and precisely in accordance with the movement of the mode select lever and so that the encoder signal picked up, generated and transmitted by pick-up device 152 from the coded indicia on encoder member 150 is always representative of the precise shift position of the transmission.

The invention electric control system for an automatic transmission apparatus will be seen to have many advantages. Specifically, the two modular assemblies minimize components and inventory requirements; the ease of assembly of the modules minimizes assembly plant labor; the power and control modules may both be pretested prior to delivery to the vehicle manufacturer with consequent improvements in reliability and warranty costs; noise and vibration from the power train to the passenger compartment is substantially minimized; the awkward and intruding gear select lever is eliminated in favor of attractive flush-mounted push buttons in the instrument panel of the vehicle; and several important safety and convenience features are provided such as automatic shifting to park when the ignition is shut off; automatic prohibition of shifts that would be inappropriate in view of the sensed vehicle speed and direction, and automatic movement of the transmission to park in the event that the driver opens the door and leaves the seat with the engine running and the transmission in a position other than park. The invention electric shift apparatus thus provides many comfort, convenience, and safety advantages as compared to existing transmission control systems and yet may be provided at a cost that is competitive with the existing systems and with projected maintenance and warranty costs less than the existing systems.

Whereas preferred embodiments of the invention have been illustrated and described in detail it will be apparent that various changes have been made in the disclosed embodiments not departing from the scope or spirit of the invention. It should be particularly noted that various of the electronic circuits, such as present gear encoder 210, desired gear encoder 214 and lamp decoder/driver 216, could be embodied in the same integrated circuit as logic control unit 220. In addition, although the automatic transmission control apparatus of this invention has been described in conjunction with control of a single motor having a single degree of freedom, those skilled in the art would recognize that this invention is equally applicable to the case of plural motors having plural degrees of freedom. In such a case the logic control unit must generate a sequence of motor controls to move from the present gear to the desired gear.

I claim:

1. An electrical control apparatus for control of a transmission apparatus in a motor vehicle having a plurality of transmission states including at least one electrical actuator adapted to shift the transmission apparatus between transmission states, said electrical control apparatus comprising:
    a plurality of momentary contact push buttons, each corresponding to a predetermined transmission state of said plurality of transmission states;
    a transmission state sensing means for generating a present transmission state signal indicative of the current state of the transmission; and
    a logic control unit connected to the at least one electrical actuator, said plurality of momentary contact push buttons, and said transmission state sensing means
        for generating a desired transmission state signal corresponding to one of said plurality of momentary contact push button switches depressed if one or more of said momentary contact push buttons are depressed, said desired transmission state signal corresponding (1) to the single momentary contact push button depressed if only a single momentary contact push button switch is depressed and (2) to one of said plurality of momentary contact push buttons switches depressed in accordance to a predetermined hierarchy of priority from among the momentary contact push buttons switches depressed if more than one momentary contact push button switch is depressed,
        for determining if said desired transmission state signal differs from said present transmission state signal, and
        for controlling the at least one electrical actuator to shift the transmission from the present state of the transmission to the state of the transmission corresponding to said desired transmission state signal if said desired transmission state signal differs from said present transmission state signal.

2. The electrical control apparatus as claimed in claim 1, wherein the transmission includes the transmission states of park, reverse, neutral and at least one forward transmission state, and wherein:
    said logic control unit generates said desired transmission state signal in accordance with the following hierarchy of priority in rank order from the highest priority to the lowest priority, if more than one momentary contact push button switch is depressed: park, reverse, neutral, and the at least one forward transmission state in order from highest final gear ratio to lowest final gear ratio.

3. The electrical control apparatus as claimed in claim 1, wherein the transmission includes the transmission state of park, and wherein:
    said logic control unit generates said desired transmission state signal corresponding to the transmission state of park if said momentary contact push button switch corresponding to the transmission state of park and any other momentary contact push button switch are depressed.

4. The electrical control apparatus as claimed in claim 1, wherein the transmission includes the transmission states of park and reverse, and wherein:
    said logic control unit generates said desired transmission state signal corresponding to the transmission state of park if said momentary contact push button switch corresponding to the transmission state of park and any other momentary contact push button switch are depressed, and corresponding to the transmission state of reverse if said momentary contact push button switch corresponding to the transmission state of reverse and any other momentary contact push button switch except said momentary contact push button switch corresponding to the transmission state of park are depressed.

5. An electrical control apparatus for control of a transmission apparatus in a motor vehicle having a plurality of transmission states including at least one electrical actuator adapted to shift the transmission apparatus between transmission states, said electrical control apparatus comprising:
    an operator input means for generating a desired transmission state signal corresponding to manual output input;
    a transmission state sensing means for generating a present transmission state signal indicative of the current state of the transmission;
    a logic control unit connected to the at least one electrical actuator, said operator input means, and said transmission state sensing means
        for determining if said desired transmission state signal differs from said present transmission state signal,
        for generating a fault signal if said desired transmission state signal differs from said present transmission state signal for longer than a predetermined period of time,
        for controlling the at least one electrical actuator to shift the transmission from the present state of the transmission to the state of the transmission corresponding to said desired transmission state signal if said desired transmission state signal differs from said present transmission state signal, and
        for inhibiting control of the at least one electrical actuator upon generation of said fault signal; and
    a fault indicator connected to said logic control means for producing an operator perceivable fault indication upon generation of said fault signal.

6. The electrical control apparatus as claimed in claim 5, wherein:
    said fault indicator consists of a fault lamp which is illuminated upon generation of said fault signal.

7. An electrical control apparatus for control of a transmission apparatus in a motor vehicle having a plurality of transmission states including at least one electrical actuator adapted to shift the transmission apparatus between transmission states, said electrical control apparatus comprising:

an operator input means for generating a desired transmission state signal corresponding to manual operator input;

a transmission state sensing means for generating a present transmission state signal indicative of the current state of the transmission;

a vehicle speed sensing means adapted for generation of at least one vehicle speed signal indicative of the vehicle speed;

a logic control unit connected to the at least one electrical actuator, said operator input means, said transmission state sensing means and said vehicle speed sensing means for determining if said desired transmission state signal differs from said present transmission state signal, for generating an error signal if said at least one speed signal indicates a vehicle speed greater than a predetermined vehicle speed corresponding to said desired transmission state signal, for controlling the at least one electrical actuator to shift the transmission from the present state of the transmission to the state of the transmission corresponding to said desired transmission state signal if said desired transmission state signal differs from said present transmission state signal, and for inhibiting control of the at least one electrical actuator upon generation of said error signal; and an error indicator connected to said logic control means for producing an operator perceivable error indication upon generation of said error signal.

8. The electrical control apparatus as claimed in claim 7, wherein:

said error indicator consists of a error lamp which is illuminated upon generation of said error signal.

9. The electrical control apparatus as claimed in claim 7, wherein the transmission includes at least the transmission states of park, reverse, low1 and low2:

said logic control unit generates said error signal if said at least one speed signal indicates a vehicle speed greater than a first predetermined vehicle speed and said desired transmission state signal corresponds to the transmission state of park, said at least one speed signal indicates a vehicle speed greater than a second predetermined vehicle speed greater than said first predetermined vehicle speed and said desired transmission state signal corresponds to the transmission state of reverse, said at least one speed signal indicates a vehicle speed greater than a third predetermined vehicle speed greater than said second predetermined vehicle speed and said desired transmission state signal corresponds to the transmission state of low1, and said at least one speed signal indicates a vehicle speed greater than a fourth predetermined vehicle speed greater than said third predetermined vehicle speed and said desired transmission state signal corresponds to the transmission state of low2.

10. The electrical control apparatus as claimed in claim 9, wherein:

said first predetermined vehicle speed is approximately 3 miles per hour;

said second predetermined vehicle speed is approximately 7 miles per hour;

said third predetermined vehicle speed is approximately 20 miles per hour; and said fourth predetermined vehicle speed is approximately 30 miles per hour.

* * * * *